Patented Sept. 29, 1942

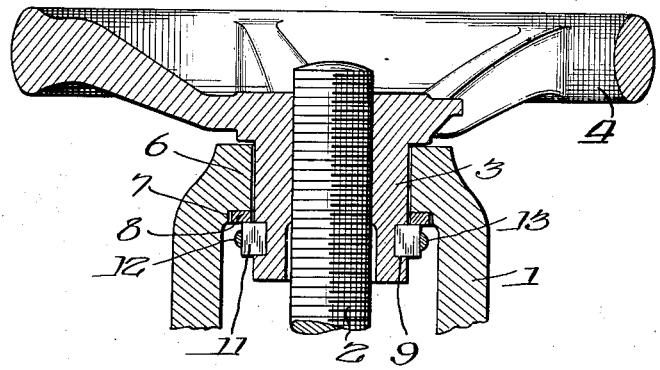
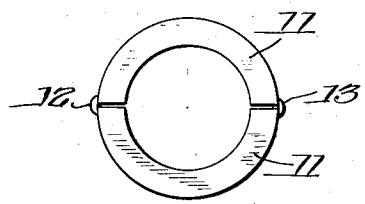
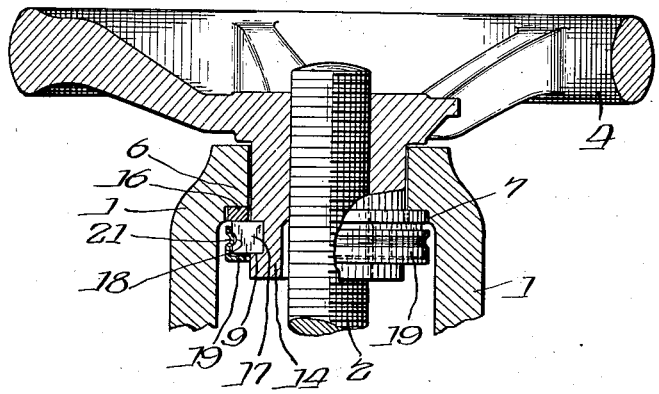
Inventor:
Richard Fennema
By: Joseph O. Lange
Atty.

2,297,137

UNITED STATES PATENT OFFICE 2,297,137

HANDWHEEL AND YOKE SLEEVE COMBINATION

Richard Fennema, Chicago, Ill., assignor to Crane Co., Chicago, Ill., a corporation of Illinois Application July 2, 1941, Serial No. 400,753

5 Claims. (Cl. 74—424.8)

This invention relates to a new and improved handwheel and yoke sleeve combination for valves and has for one of its principal objects the provision of a novel form of thrust bearing easily renewable and operating between a conventional valve handwheel or the like and the yoke sleeve and the yoke proper.

An important object of this invention is to provide a relatively cheap and economical bearing for the usual high wheel torque attendant the opening and closing of valves.

A further important object of this invention is to provide in this type of construction a simple and durable handwheel and yoke sleeve combination and thrust bearing therefor which is equally as efficient in its operation as structures vastly more expensive.

Other and further important objects will be apparent from the disclosures in the accompanying drawing and following specification.

The invention in a preferred form is shown in the drawing and hereinafter more fully described.

In the drawing:

Fig. 1 is a fragmentary sectional assembly view of the device of this invention.

Fig. 2 is a plan elevation of the split bearing ring embodying the invention.

Fig. 3 is a sectional view of a modification of the device.

As shown in the drawing and referring to Fig. 1, the reference numeral 1 indicates generally the yoke of a valve or the like of the type having a rising and non-turning stem 2. An internally threaded yoke sleeve 3 for threaded engagement with the stem 2 is preferably, but not necessarily, an integral part of the handwheel 4. The yoke 1 is supplied at its upper portion with a solid peripheral hub portion 6 for the journaling support of the yoke sleeve 3. An annularly recessed portion 7 in the peripheral hub portion 6 is provided with a removably positioned bearing ring 8 in nested relation as indicated. The yoke sleeve 3 has an annularly extending groove 9 into which is fitted the split bearing ring 11 better shown in detail in Fig. 2. This ring 11 is preferably made in a plurality of sections in order to facilitate its assembly within the groove 9 after which it is tack welded, or otherwise connected as indicated at 12 and 13.

In operation of the assembly, the handwheel 4 is rotated, say in a clockwise direction, causing a similar rotation of the integral yoke sleeve 3 and a raising of the stem 2. It is customary to employ this type of opening and closing control particularly on wedge gate valves which require a great amount of torque to lift because of their wedging characteristics. It will be readily seen, however, that this type of bearing can be applied to any type valve whether it be gate or globe. The thrust load occasioned by the lifting of the valve from its seat will be distributed through the yoke regardless of the connection or the type of bearing used. In my construction the ring 11 transmits the lifting load to the bearing ring 8 which immediately transfers it to the yoke proper. Therefore the entire end thrust load borne by the stem is carried between the two comparatively small friction bearing rings 8 and 11.

As a result of the use of these bearing rings, the handwheel 4 and the yoke sleeve 3 may preferably be cast in one piece in a relatively cheap material such as malleable iron. Heretofore it was necessary to make the entire yoke sleeve of a high quality bronze, steel, or nickel alloy, realizing the necessity of its being capable of absorbing high thrust loads. It is thus apparent that the efficiency of more expensive bearings is reproduced in this simple, economical and easily renewable multi-ring friction bearing construction.

The modification of the device as set forth in Fig. 3 similarly shows a fragmentary assembly portion of a yoke sleeve 14, a bearing ring 16 similar to the bearing ring 8 and a split bearing ring 17 corresponding to the split ring 11 of Figs. 1 and 2. In the presently described arrangement, however, the outer circumference of the ring 17 is provided with an annular groove 18. A press-fitted retainer ring 19 of L shaped cross-section is applied over the two sections of the split ring 17 and thus the retainer ring 19 performs a function similar to that of the previously described tack welding in that the ring is made unitary by both methods. In order to assure of the ring 19 remaining in a press-fitted relationship with the split ring 17, it is preferable that indentations 21 are provided at certain points around the periphery opposite the groove 18 whereby the projections obtained by indenting the outer periphery of the ring 19 fit into the groove 18 preventing removal of the ring 19 from the split ring 17. Obviously, these indentations 21 and the resultant projections of the ring 19 are not necessarily limited to spaced points but can be made annularly continuous, if desired.

The torque required to turn the handwheel in a valve using this type of construction is greatly reduced. By actual test it has been proven that the thrust is substantially concentrated at the location of contact of the bearing rings 7, 11, 16 and 17. Replacement of the expensive hardened steel yoke sleeves and of the yoke itself by a softer, less expensive material in combination with the small bearing rings contributes substantially to cost reduction. Previously any efforts to incorporate bearings in a similar location in valve actuating means resulted in complex structures and the use of costly ball or roller bearings with their accompanying appurtenances.

It is apparent that my friction bearing is the utmost in simplicity and economy and that it is a new departure from all yoke constructions heretofore known to the valve art.

I am aware that numerous details of construction can be varied throughout a wide range without departing from the principles incorporated in this specification and as determined by the appended claims.

I claim:

1. Actuating means for a valve or the like having a yoke and a rising non-turning threaded stem, comprising a handwheel and a yoke sleeve threadedly engaging said stem, the said yoke sleeve having an external annular groove therearound, a separable multi-piece ring substantially thicker than the depth of the groove and placed in the groove with a portion projecting therefrom, means for holding the said multi-piece ring in fixed assembled relation within the said groove, the said yoke having an upper annular hub section with a lower annular portion, whereby the projecting portion of the said multi-piece ring coacts with the lower annular portion to distribute the stress load from the stem to the yoke.

2. Actuating means for a valve or the like having a yoke and a rising non-turning threaded stem, comprising an integral handwheel and yoke sleeve threadedly engaging said stem, the said yoke sleeve having an external annular slot therearound, a two-piece ring thicker than the depth of the slot and placed in the slot and with an annular portion projecting therefrom, means for making said two-piece ring unitary, the said yoke having an upper annular section having an internal annular cutaway portion, a bearing ring removably mounted therein, whereby the projecting portion of the two-piece ring cooperates with the bearing ring in the yoke to distribute the load from the stem to the said yoke, the said means for making the said two-piece ring unitary including an independent retainer ring.

3. Actuating means for a valve having a yoke and a rising non-turning threaded stem, comprising an integral handwheel and yoke sleeve threadedly engaging said stem, the said yoke sleeve having an external annular groove therearound, a two-piece ring having an external annular groove, said two-piece ring placed in the yoke sleeve groove and a portion projecting therefrom, means for making said two-piece ring unitary, the said yoke having an upper annular section having an inner recessed portion, a ring removably mounted in the recessed portion, whereby the projecting portion of the two-piece ring coacts with the second named ring in the yoke to distribute the axial load from the stem to the yoke, the said means for making the said two-piece ring unitary being a relatively close-fitted retainer ring having projections extending therefrom into the annular groove in the said two-piece ring.

4. Actuating means for a valve having a yoke and a rising non-turning threaded stem, comprising an integral handwheel and yoke sleeve of relatively soft material threadedly engaging said stem, the said yoke sleeve having an external annular slot therearound, a two-piece ring of relatively hard material and of a thickness greater than the depth of the annular slot in the yoke sleeve and placed in said slot and having a portion projecting therefrom, means for making said two-piece ring unitary, the said yoke having an upper annular section having an internal annular cutaway portion, a solid ring of relatively hard material removably mounted therein, the projection of the said two-piece ring coacting with the said solid ring in the yoke to distribute the load stress from the stem to the yoke, weld means for making the said two-piece ring unitary, whereby the rings of relatively hard material carry the entire longitudinal load in seating the said valve.

5. Actuating means for a valve having a yoke and a rising non-turning threaded stem, comprising an integral handwheel and yoke sleeve of relatively soft material threadedly engaging said stem, the said yoke sleeve having an external annular slot therearound, a two-piece ring of relatively hard material having an external annular groove, the two-piece ring being thicker than the depth of the annular slot in the said yoke sleeve and placed in said annular slot, means for making said two-piece ring unitary, the said yoke having an upper annular section having an internal annular cutaway portion, a ring of relatively hard material removably mounted therein, said means for making the said two-piece ring unitary being an annular retainer ring with projections punched from the said annular ring into the annular groove in the two-piece ring, whereby the rings of relatively hard material distribute the stress load from the stem to the yoke.

RICHARD FENNEMA.